W. L. BROWN.
GAS METER.
APPLICATION FILED FEB. 16, 1916.

1,196,653.

Patented Aug. 29, 1916.

WITNESS:
Rob R Kitchel

INVENTOR
William Laird Brown
BY
Augustus B Stoughton
ATTORNEY.

UNITED STATES PATENT OFFICE.

WILLIAM LAIRD BROWN, OF LANSDOWNE, PENNSYLVANIA, ASSIGNOR TO WILLIAM E. HELME AND JOHN McILHENNY, BOTH OF PHILADELPHIA, PENNSYLVANIA, CO-PARTNERS TRADING AS HELME & McILHENNY.

GAS-METER.

1,196,653. Specification of Letters Patent. Patented Aug. 29, 1916.

Application filed February 16, 1916. Serial No. 78,573.

*To all whom it may concern:*

Be it known that I, WILLIAM LAIRD BROWN, a citizen of the United States, and a resident of Lansdowne, in the county of Delaware and State of Pennsylvania, have invented certain new and useful Improvements in Gas-Meters, of which the following is a specification.

The principal object of the present invention is to provide a simple, reliable and comparatively inexpensive stop motion mechanism for gas meters of which the stop, or click, as it is sometimes called, can be made of a single piece and by which the tangent arm is permitted to turn backward at least one revolution before being stopped, which is found in practice sufficient to relieve any undue pressure that may be brought to bear upon the mechanism of the meter and that might tend to destroy or injure the same by reason of such changes of gas pressure as may and frequently do occur when the gas has been turned off from a building or residence in which case the temperature may change after the gas has been turned off, so that when the gas is again turned on, the pressure may be higher at the outlet of the meter than it is at the inlet of the meter. Such strain may be sufficient to deform the meter mechanism permanently, thereby affecting the accuracy of the meter; or even sufficient to break a part of the mechanism, thereby causing a "won't pass gas" condition, and necessitating the removal of the meter. Moreover, such a strain may be brought about in the ordinary working of the meter as follows: When gas is being consumed, the piping between burner and meter is filled with moving gas at a temperature usually lower than house temperature, being drawn from underground mains. Now when the burner is shut off, the gas now at rest rises to the house temperature, expanding and passing back into the mains, causing a reverse rotation of the meter. If this reverse rotation is such as to bring the tangent arm under substantial gas pressure into engagement with the click, a dangerous strain will be thrown on the meter mechanism.

The invention will be claimed at the end hereof but will be first described in connection with the embodiment of it chosen for illustration in the accompanying drawings in which—

Figure 1:
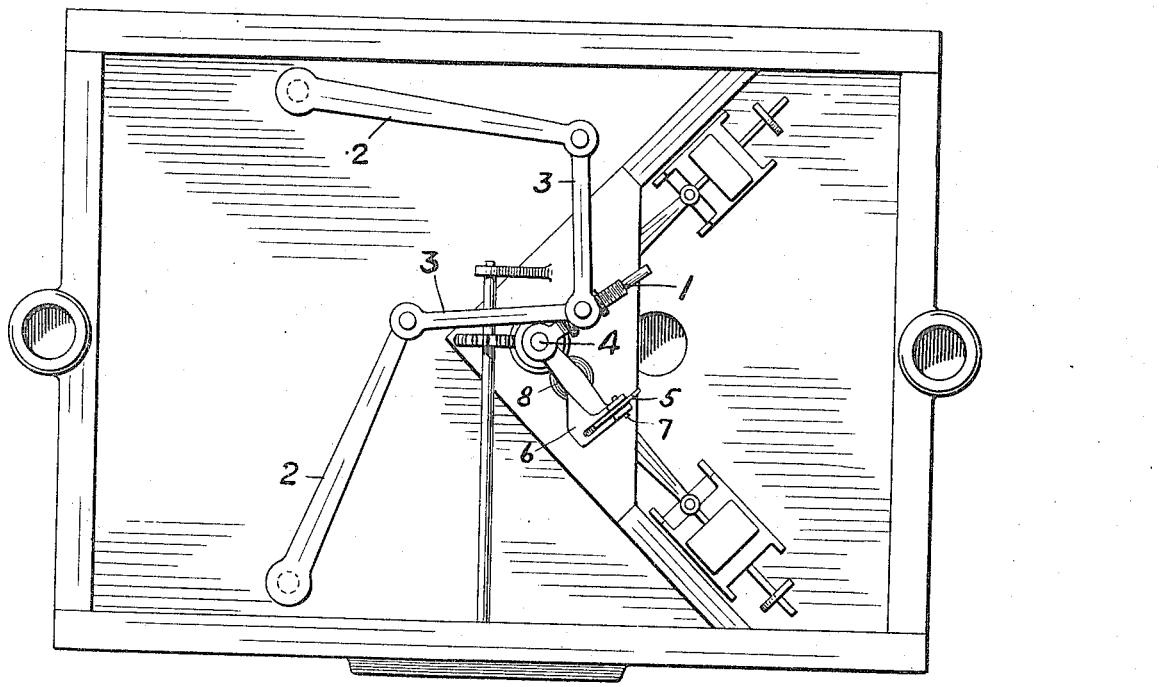
Figure 2:
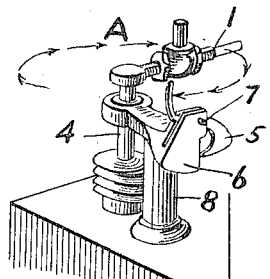
Figure 3:
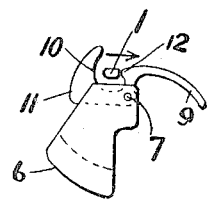
Figure 4:
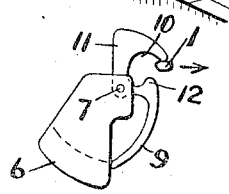
Figure 5:
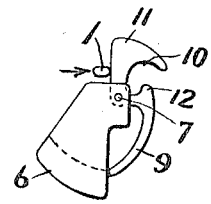

Figure 1, is a top or plan view of so much of the top of a gas meter as is necessary for illustrating the embodiment of my invention therein. Fig. 2, is a perspective view of parts of a meter embodying features of the invention, and Figs. 3, 4 and 5, are diagrammatic views illustrative of the mode of operation of the invention.

In the drawings 1, is the tangent arm of a gas meter and it is revolved by the action of the bellows, not shown, through the intervention of the flag arms 2, the links 3, and the shaft 4, to which the tangent is rigidly connected.

5, designates the stop or click collectively. The stop or click 5, is pivotally connected to a stop support 6, in such a way that the only relative motion of the two parts is one of rotation. As shown this is accomplished by means of a pivot pin or pivot 7, in respect to which neither of the parts which it connects has sliding motion, for example, the hole in which the pin turns is only enough larger in diameter than the pin to permit freedom of rotary motion. The stop support 6, is shown to comprise a fork between the arms of which the stop or click is arranged and this fork is connected to a pedestal or post 8, which constitutes a bracket for supporting the shaft 4. The stop or click may have the general form of the numeral 5, and it is provided with oppositely disposed recessed parts 9 and 10, and with the headed stem 11. The part of the stop to one side of the pivot or axis 7, is heavier than the part of the stop to the other side of the pivot or axis 7. As shown in the drawings the headed stem 11, is the heaviest and this is brought about by an appropriate distribution of the metal. The stop may and preferably does consist of one piece disposed substantially in one plane and this is a matter of obvious importance in minimizing the expense of production and assembly. Again the shape of the stop or click is such that it can be readily stamped and such that it will operate reliably and properly under the conditions to which it is exposed, which sometimes tend to subject it to a sticky or gummy deposit.

In the normal operation of the meter, the click or stop 5, occupies the position shown in Fig. 2, with its heavier end 11, depending from its pivot or axis 7, and with its lighter end upright in the path described by the tangent arm 1, and represented by the arrows A, in Fig. 2. The tangent arm turning clockwise, since that is the assumed direction of its rotation in Fig. 2, at each revolution collides with the concaved face of the recessed part 9, and so tips the stop or click and revolves freely. In the event of retrograde or counter-clockwise motion of the tangent arm it collides with the convex face of the part 9, thus turning the stop or click 5, and entering the recess 10, and operating upon the part or shoulder 12, of that recess (Fig. 3) so as to throw the click or stop into the position shown in Fig. 4, with the end of its part 9, in contact with the stop-support 6, in which position it remains because its heavier end 11, is now upward and operates to hold the part 9, in the position last described. At the succeeding counter-clockwise turn of the tangent arm 1, it collides with the face of the stem 11, as shown in Fig. 5, and retrograde or counter-clockwise motion of the tangent arm is arrested. The tangent arm is free to resume rotation in clockwise direction and in so doing it collides with the wall of the recess 10, in a way that can be readily understood by referring to Fig. 4, and considering or assuming that the tangent arm 1, in moving from right to left so restores the click or stop to the position shown in Fig. 2.

It will be obvious to those skilled in the art to which the invention relates that changes may be made in details of construction and arrangement without departing from the spirit of the invention since the latter is not limited as to those matters or further than the prior state of the art and the appended claims may require.

What I claim is:

1. In a gas meter the combination of a rotatable tangent arm, a fixed stop-support, and a click or stop having an unchanging pivotal axis and normally permitting forward rotation of the tangent arm and adapted by a backward revolution of the tangent arm to be inverted and poised in contact with said fixed stop-support to prevent further retrograde movement of the tangent arm.

2. In a gas meter the combination of a fixed stop-support provided with arms, a tangent arm, and a detent stop arranged between said arms and having unchanging pivotal connection therewith and adapted to depend in stable equilibrium clear of the fixed stop-support and to be inverted into a position in contact with the fixed stop-support.

3. In a gas meter the combination of a tangent arm, a 5-shaped element constituting a click or detent stop, a stop-support, and pivotal connection between the 5-shaped element and the stop-support, substantially as described.

4. In a gas meter the combination of a stop-support, a tangent arm, a detent stop, a connection between the detent stop and support for affording the detent stop motion of rotation only and said detent stop provided with oppositely disposed recesses adapted to coöperate with the tangent arm, substantially as described.

5. In a gas meter the combination of a rotatable tangent arm, and a click or stop consisting of one movable element having an unchanging pivotal axis, arranged to permit free revolution of said tangent arm in one direction and to arrest its motion in the reverse direction after at least one reverse revolution.

6. In a gas meter, the combination of a rotatable tangent arm and a click or stop consisting of one movable element having an unchanging pivotal axis, arranged to be yieldingly maintained in the path of said tangent arm while the latter is rotating in one direction, and to yieldingly pass said tangent arm in its first reverse revolution, and be set thereby to arrest said tangent arm in its second reverse revolution.

7. In a gas meter the combination of a rotatable tangent arm, and a click or stop consisting of one substantially plane movable element, arranged to permit free revolution of said tangent arm in one direction and to arrest its motion in the reverse direction after at least one reverse revolution.

8. In a gas meter the combination of a rotatable tangent arm and a click or stop consisting of one movable substantially plane element, arranged to be yieldingly maintained in the path of said tangent arm while the latter is rotating in one direction, and to yieldingly pass said tangent arm in its first reverse revolution, and be set thereby to arrest said tangent arm in its second reverse revolution.

9. In a gas meter comprising rotary mechanism, a click or stop consisting of one substantially plane movable element having an unchanging pivotal axis, arranged to permit the free actuation of said mechanism in one direction and to arrest its actuation in the reverse direction after at least one reverse revolution.

10. In a gas meter comprising rotary mechanism, a click or stop consisting of a single substantially plane movable element having an unchanging pivotal axis, arranged to be yieldingly maintained in the path of said rotary mechanism while rotating in one direction, and to yieldingly pass said mechanism in its first reverse rotation, and be set thereby to arrest said mechanism in its second reverse rotation.

11. In a gas meter the combination of rotary mechanism and a click or stop consisting of one movable element having an unchanging pivotal axis, arranged to be yieldingly maintained in the path of said rotary mechanism while the latter is rotating in one direction, and to yieldingly pass said rotary mechanism in its first reverse revolution, and be set thereby to arrest said rotary mechanism in its second reverse revolution.

12. In a gas meter the combination of rotary mechanism and a click or stop consisting of one movable substantially plane element, arranged to be yieldingly maintained in the path of said rotary mechanism while the latter is rotating in one direction, and to yieldingly pass said rotary mechanism in its first reverse revolution, and be set thereby to arrest said rotary mechanism.

WILLIAM LAIRD BROWN.

Copies of this patent may be obtained for five cents each, by addressing the "Commissioner of Patents, Washington, D. C."